United States Patent
Munshi et al.

(10) Patent No.: US 6,734,867 B1
(45) Date of Patent: May 11, 2004

(54) CACHE INVALIDATION METHOD AND APPARATUS FOR A GRAPHICS PROCESSING SYSTEM

(75) Inventors: Aaftab Munshi, Los Gatos, CA (US); James R. Peterson, Portland, OR (US)

(73) Assignee: Micron Technology, Inc., Boise, ID (US)

( * ) Notice: Subject to any disclaimer, the term of this patent is extended or adjusted under 35 U.S.C. 154(b) by 899 days.

(21) Appl. No.: 09/607,504

(22) Filed: Jun. 28, 2000

(51) Int. Cl.[7] .................................................. G09G 5/36
(52) U.S. Cl. ...................... 345/557; 345/531; 345/537; 711/113; 711/118
(58) Field of Search ................................ 345/531, 532, 345/536, 537, 557, 558; 711/121, 118, 135, 136, 144, 158, 113

(56) References Cited

U.S. PATENT DOCUMENTS

| | | | | |
|---|---|---|---|---|
| 5,402,147 A | * | 3/1995 | Chen et al. .................. 345/546 |
| 5,459,835 A | | 10/1995 | Trevett ......................... 395/163 |
| 5,537,572 A | * | 7/1996 | Michelsen et al. ........... 711/135 |
| 5,692,154 A | * | 11/1997 | Tucker et al. ................ 711/141 |
| 5,710,905 A | * | 1/1998 | Wan ............................. 711/118 |
| 5,761,720 A | | 6/1998 | Krishnamurthy et al. ... 711/140 |
| 5,829,035 A | * | 10/1998 | James et al. ................. 711/141 |
| 5,835,096 A | | 11/1998 | Baldwin ...................... 345/430 |
| 6,021,459 A | * | 2/2000 | Norman et al. ................. 711/5 |
| 6,069,638 A | | 5/2000 | Porterfield ................... 345/516 |
| 6,157,987 A | | 12/2000 | Krishnamurthy et al. ... 711/129 |
| 6,212,602 B1 | * | 4/2001 | Wicki et al. ................. 711/122 |
| 6,378,047 B1 | * | 4/2002 | Meyer ......................... 711/135 |
| 6,437,789 B1 | * | 8/2002 | Tidwell et al. .............. 345/557 |
| 6,513,099 B1 | * | 1/2003 | Smith et al. ................. 711/118 |

* cited by examiner

Primary Examiner—Matthew C. Bella
Assistant Examiner—Mackly Monestime
(74) Attorney, Agent, or Firm—Dorsey & Whitney LLP

(57) ABSTRACT

A cache for a graphics system storing both an address tag and an identification number for each block of data stored in the data cache. An address and identification number of a requested block of data is provided to the cache, and is checked against all of the address and identification number entries present. A block of data is provided if both the address and the identification number of the requested data matches an entry in the cache. However, if the address of the requested data is not present, or if the address matches an entry but the associated identification number does not match, a cache miss occurs, and the requested graphics data must be retrieved from a system memory. The address and identification number are updated, and the requested data replaces the former graphics data in the data cache. As a result, a block of data stored in the cache having the same address as the requested data, but having data that is invalid, can be invalidated without invalidating the entire cache.

21 Claims, 4 Drawing Sheets

CACHE INVALIDATION METHOD AND APPARATUS FOR A GRAPHICS PROCESSING SYSTEM

TECHNICAL FIELD

The present invention is related generally to the field of computer graphics, and more particularly, to caching graphics information in a computer graphics processing system.

BACKGROUND OF THE INVENTION

A graphics accelerator is a specialized graphics processing subsystem for a computer system. An application program executing on a processor of the computer system generates geometry input data that defines graphics elements for display on a display device. The application program typically transfers the geometry information from the processor to the graphics processing system. The graphics processing system, as opposed to the processor, has the task of rendering the corresponding graphics elements on the display device to allow the processor to handle other system requests. The graphics data is processed per graphics frame before being rasterized on the display device.

As the use and application of computer graphics continues to grow, there is an increasing demand for graphics processing systems that provide more realistic image rendering, such as more realistic coloring, shading, and detailing. There is also an increasing demand for graphics processing systems that can realistically render three dimensional (3D) objects, as well as provide seamless animation of 3D images. Consequently, current graphics processing systems must be able to not only process more graphics data, but also at a faster processing rate. Processing this amount of data requires not only high-speed graphics processing units, but also requires that graphics data be provided to the processor at high-speeds. It is often the case where a host memory of the computer system cannot provide graphics data at a sufficient rate to satisfy this demand, so high-speed caches have been integrated into graphics processing systems to supplement the host memory and provide a limited quantity of graphics data quickly.

Although data caches facilitate high-speed processing, a cache management technique must be employed in order to maintain the integrity of the cached graphics data. For example, the data stored in the cache must be updated or marked as invalid whenever the graphics data changes, such as when new graphics data replaces older graphics data in the host memory. With respect to texture mapping applications, this may occur at a rate of approximately once per frame, but can occur more frequently if there are more texture data than can fit in the host memory at one time, or less frequently if the texture data are used for a number of frames. A graphics frame is typically considered to be the data necessary to produce a full screen image on the display.

Data caches of conventional graphics processing systems are typically not very large. These smaller caches may be large enough to store only the graphics data required to generate one scan line of data. With caches such as these, a cache management technique that invalidates the entire cache each time new graphics data replaces older graphics data in the host memory may be an efficient method for cache management because invalidating the entire cache can be accomplished simply and quickly for smaller-sized caches. Often times, the entire cache can be invalidated in a single clock cycle. Nevertheless, it is often desirable to have a large cache. For example, one benefit is that a larger cache increases the chance of a cache "hit," and consequently, more data is available to be provided for processing at high-speed. However, the increase in system performance provided by a larger cache may not justify the cost of fabricating a larger cache, which occupies more physical space on the die than a smaller cache.

One reason larger-sized caches provide limited benefits is that efficient cache management of large caches is difficult with conventional cache management techniques. Unlike with small caches, invalidating the entire cache after each time new graphics data replaces older graphics data in the host memory does not result in efficient cache use because the greater majority of the other data stored in the larger-sized cache is not necessarily invalid as well. Additionally, it is difficult to invalidate a particular data block in the cache whenever new graphics data replaces older graphics data in system memory because locating and setting an invalidation flag for that particular data block typically requires complex circuitry. This especially so with a fully associative cache where data may be stored in any of the available data blocks.

Therefore, there is a need for a cache management technique that may be used with various sized data caches to enhance graphics processing performance.

SUMMARY OF THE INVENTION

A method and apparatus for storing blocks of graphics data written to a memory in a graphics processing system. The cache memory includes a first memory for storing an address and an associated ID number for each block of graphics data stored in the cache memory. The address stored in the first memory corresponds to a storage location in the memory. The associated ID number stored in the first memory is assigned to the block of graphics data to distinguish between blocks of graphics data having the same address. The cache memory further includes a comparator coupled to the first memory for generating a signal in response to receiving a requested address and ID number for graphics data that matches an address and its associated ID number stored in the first memory. A second memory coupled to the comparator provides the block of graphics data corresponding to the matching address and associated ID number in response to receiving the signal from the comparator. However, if the requested address does not match an entry in the first memory, or the requested address matches an entry, but the requested ID number does not match the ID number associated with the matching address, a cache miss occurs, and the requested graphics data is retrieved from a system memory. The former address and ID number, and former graphics data are replaced with the requested address and ID number, and the retrieved graphics data, respectively.

DETAILED DESCRIPTION OF THE INVENTION

Figure 1:
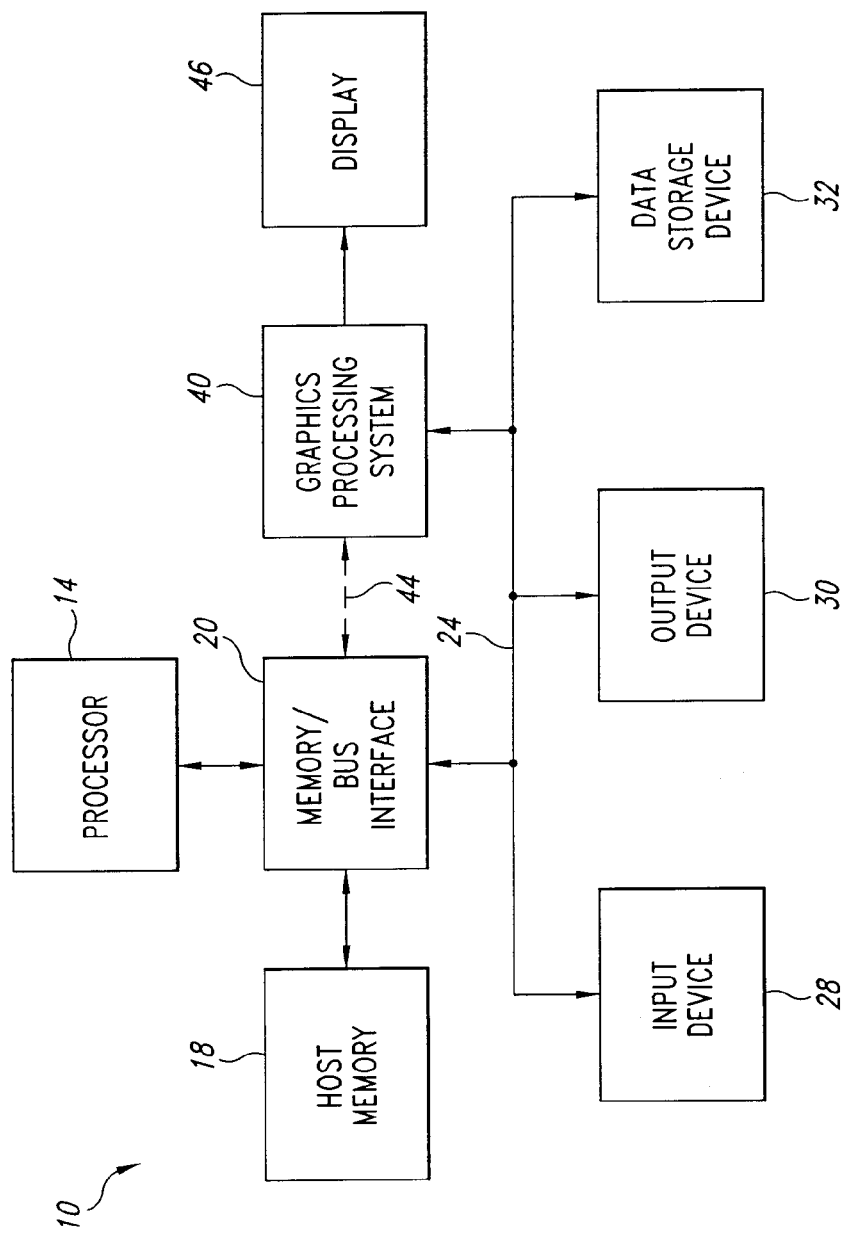
FIG. 1 is a block diagram of a computer system in which an embodiment of the present invention is implemented.

A cache invalidation method and apparatus for caching data are described. FIG. 1 illustrates a computer system 10 in which embodiments of the present invention are implemented. The computer system 10 includes a processor 14 coupled to a host memory 18 by a memory/bus interface 20. The memory/bus interface 20 is also coupled to an expansion bus 24, such as an industry standard architecture ("ISA") bus or a peripheral component interconnect ("PCI") bus. The computer system 10 also includes one or more input devices 28, such as a keypad or a mouse, coupled to the processor 14 through the expansion bus 24 and the memory/bus interface 20. The input devices 28 allow an operator or an electronic device to input data to the computer system 10. One or more output devices 30 are coupled to the processor 14 to provide output data generated by the processor 14. The output devices 30 are coupled to the processor 14 through the expansion bus 24 and memory/bus interface 20. Examples of output devices 30 include printers and a sound card driving audio speakers. One or more data storage devices 32 are coupled to the processor 14 through the memory/bus bridge interface 20, and the expansion bus 24 to store data in or retrieve data from storage media (not shown). Examples of storage devices 24 and storage media include fixed disk drives, floppy disk drives, tape cassettes and compact-disk read-only memory drives.

The computer system 10 further includes a graphics processing system 40 coupled to the processor 14 through the expansion bus 24 and memory/bus interface 20. Embodiments of the present invention are implemented within the graphics processing system 40. Optionally, the graphics processing system 40 may be coupled to the processor 14 and the host memory 18 through other architectures, such as through the memory/bus interface 20 and a high speed bus 44, such as an accelerated graphics port (AGP), to provide the graphics processing system 40 with direct memory access (DMA) to the host memory 18. That is, the high speed bus 44 and memory bus interface 20 allow the graphics processing system 40 to read and write host memory 18 without the intervention of the processor 14. Thus, data may be transferred to and from the host memory 18 at transfer rates much greater than over the expansion bus 24. A display 46 is coupled to the graphics processing system 40 to display graphics images, and may be any type, such as a cathode ray tube (CRT) for desktop, workstation or server application, field emission display (FED) or a liquid crystal display (LCD) or the like commonly used for portable computer.

Figure 2:
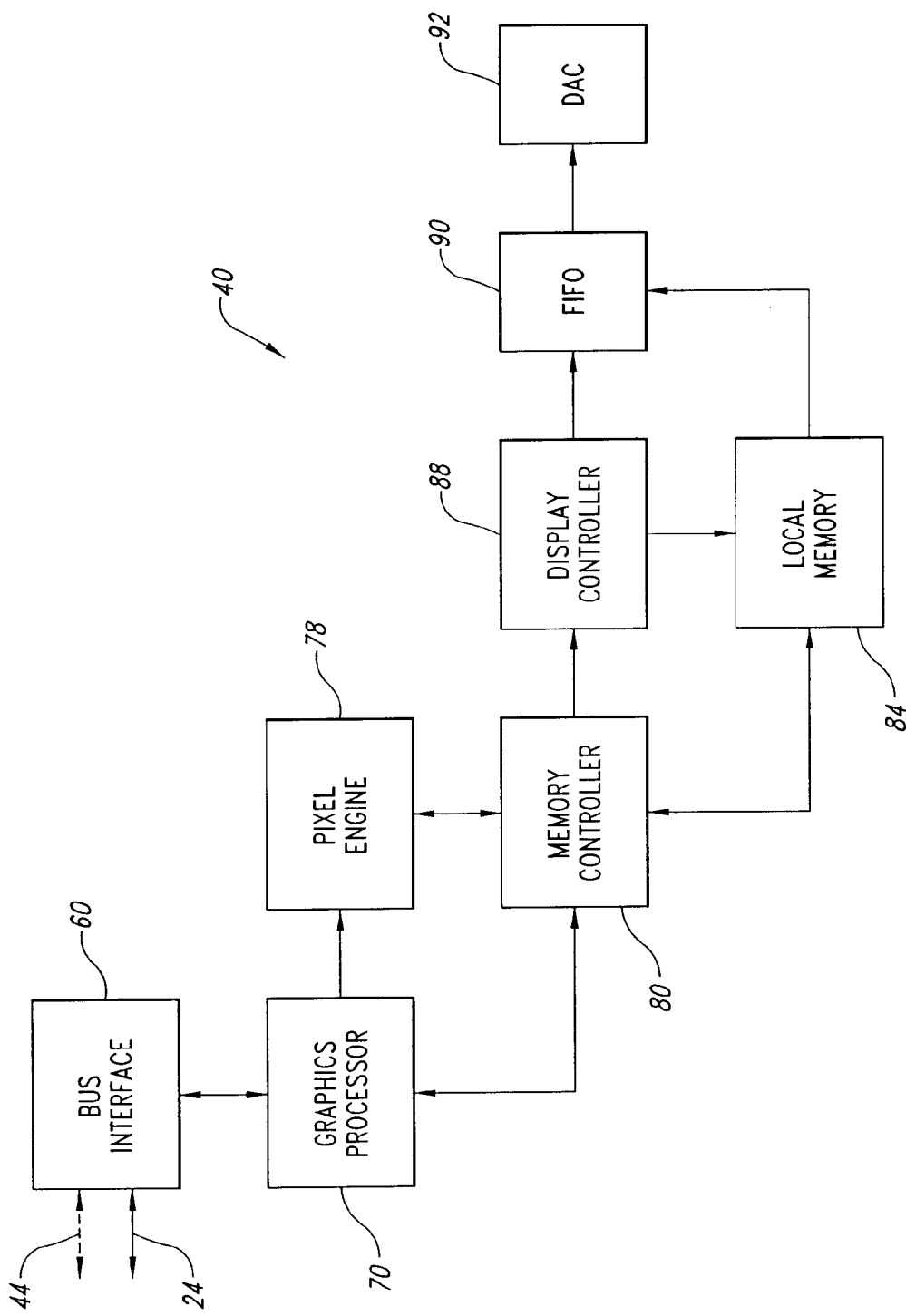
FIG. 2 is a block diagram of a graphics processing system in the computer system of FIG. 1.

FIG. 2 illustrates circuitry included within the graphics processing system 40, including circuitry for performing various three-dimensional (3D) graphics function. As shown in FIG. 2, a bus interface 60 couples the graphics processing system 40 to the PCI bus 24. Where the graphics processing system 40 is coupled to the processor 14 and the host memory 18 through the high speed data bus 44 and the memory/bus interface 20, the bus interface 60 will include a DMA controller (not shown) to coordinate transfer of data to and from the host memory 18 and the processor 14. A graphics processor 70 is coupled to the bus interface 60 and is designed to perform various graphics and video processing functions, such as, but not limited to, generating vertex data and performing vertex transformations for polygon graphics primitives that are used to model 3D objects. In a preferred embodiment, the graphics processor 70 is a reduced instruction set computing (RISC) processor. The graphics processor 70 further includes circuitry for performing various graphics functions, such as clipping, attribute transformations, rendering of graphics primitives, and generating texture coordinates from a texture map.

A pixel engine 78 is coupled to receive the graphics data generated by the graphics processor 70, as well as an ID number assigned by the graphics processor 70 to blocks of graphics data stored in the host memory 18. Use of the ID numbers by the graphics processing system 40 will be explained in greater detail below. The pixel engine 78 contains circuitry for performing various graphics functions, such as, but not limited to, texture application, bilinear filtering, fog, blending, color space conversion, and dithering. A memory controller 80 coupled to the pixel engine 78 and the graphics processor 70 handles memory requests to and from the host memory 18, and a local memory 84. The local memory 84 stores both source pixel color values and destination pixel color values. Destination color values are stored in a frame buffer (not shown) within the local memory 84. In a preferred embodiment, the local memory 84 is implemented using random access memory (RAM), such as dynamic random access memory (DRAM), or static random access memory (SRAM). A display controller 88 coupled to the local memory 84 and to a first-in first-out (FIFO) buffer 90 controls the transfer of destination color values stored in the frame buffer to the FIFO 90. Destination values stored in the FIFO 90 are provided to a digital-to-analog converter (DAC) 92, which outputs red, green, and blue analog color signals to the display 46 (FIG. 1).

Figure 3:
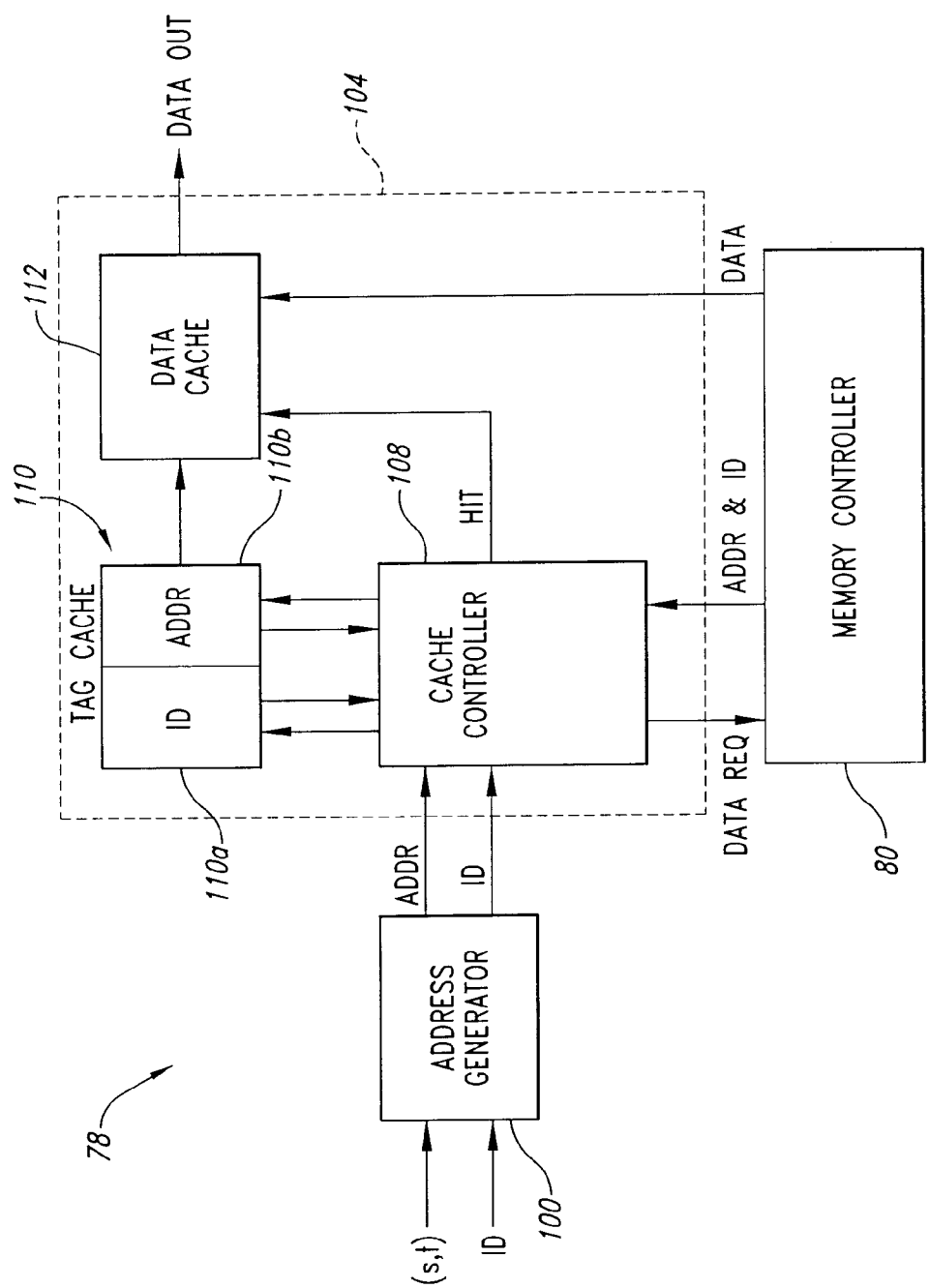
FIG. 3 is a block diagram of circuitry from a pixel engine in the graphics processing system of FIG. 2.

FIG. 3 illustrates circuitry included within the pixel engine 78, including circuitry for providing texture data used in texture mapping functions. Texture mapping refers to techniques for adding surface detail, or a texture map, to areas or surfaces of the polygons displayed on the display 46. Stored in the host memory 18 of the computer system 10, a typical texture map includes point elements ("texels") which reside in a (s, t) texture coordinate space. A texture image is represented in the host memory 18 as a bitmap or other raster-based encoded format. The process of texture mapping occurs by accessing encoded surface detail points, or texels, and transferring the texture map texels to predetermined points of the graphics primitive being texture mapped. The individual texels of the texture map data are applied within the respective polygon with the correct placement and perspective of their associated polygon. Thus, color values for pixels in the (x, y) display coordinate space are determined based on the color or visual attributes of texels in the (s, t) texture map that correspond to the pixels of the graphics primitive. After texture mapping, a version of the texture image is visible on surfaces of the graphics primitive with the proper perspective.

In operation, after the graphics processor 70 has finished processing the graphics data, such as generating and transforming vertex data, and determining which graphics primitives should be rendered on the display 46, textures are applied to the displayed primitives. The graphics processor 70 issues a command for the various textures maps required for rendering the displayed primitives to be read from the host memory 18. The graphics processor 70 further assigns an ID number to the blocks of texture data read from the host memory 18. As will be described below, a variety of techniques may be used to select an ID number to assign to the texture data. The coordinates of each texel used for rendering the displayed primitives are generated by the graphics processor 70 and provided along with the ID number to the address generator 100.

An address generator 100 receives the texture map coordinates (s, t) from the graphics processor 70, and converts them to memory addresses corresponding to the addresses at which the blocks of texture data are stored in the host memory 18. The address generator 100 also receives the ID number from the graphics processor 70. A texture cache 104 coupled to the address generator 100 receives the memory addresses and the ID numbers to determine whether the requested block of texture data is present in the texture cache 104. The ID number may be a 16 bit word included with other texture state data, such as a memory address, texture type, width, and height, provided to the texture cache 104 when checking against the entries. However, in the present example, only the memory address and the ID number will be described as being provided to the texture cache controller 104 in order to simplify explanation.

The texture cache 104 includes a cache controller 108 coupled to the address generator 100, as well as a tag cache 110 and a data cache 112, which are both coupled to the cache controller 108. The tag cache 110 includes an ID portion 110a and an address portion 110b for storing an ID number and address for each block of texture data stored in the data cache 112. The cache controller 108 and the data cache 112 are coupled to the memory controller 80 to transfer graphics data between the data cache 112 and either the local memory 84 or the host memory 18.

In order for there to be a cache hit, both the memory address and the ID number of the requested texture data must match an entry in the tag cache 110. If there is a cache hit, the texture data corresponding to the matching address and ID number is provided by the data cache 112 to the next stage (not shown) in the texture data processing. However, if none of the entries in the tag cache 110 matches the address and ID number of the requested texture data, or the address matches, but the ID number associated with that entry does not match the ID number of the requested texture data, a cache "miss" occurs, and a memory request is made by the cache controller 108 to the memory controller 80 to obtain the requested texture data from the host memory 18. After the requested texture data has been retrieved, the data is written to the data cache 112, and the corresponding memory address and ID number are written to the tag cache 110. The texture data is then provided to the next texture processing stage.

As mentioned previously, the ID number assigned to the blocks of texture data of a texture map may be assigned in a variety of manners. The ID number is assigned in a manner to distinguish between blocks of graphics data having the same memory address. Whenever new texture data replaces older texture data in the host memory 18, a new ID number is assigned to the blocks of new data. Thus, invalidating the entire cache each time new data is written to the host memory 18 can be avoided. In one embodiment, the ID number corresponds to the frame number of the frame to be rendered when the blocks of texture data are written into the host memory 18. As mentioned previously, a graphics frame is typically considered to be the data necessary to produce a full screen image on the display 46. This method of assigning ID numbers can be illustrated by the following example.

Figure 4A:
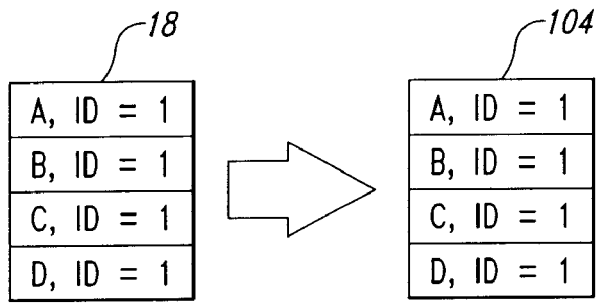
FIGS. 4A–C are memory maps for the graphics processing system of FIG. 2 at various caching steps.

In preparation of rendering frame 1, the graphics processor 70 commands textures A, B, C, and D to be stored in the host memory 18. These four textures make up a first working set of texture data. Each block of texture data for the textures A, B, C, and D are assigned ID=1, corresponding to frame 1, that is, the frame to be rendered when the textures A, B, C, and D were loaded into the host memory 18. As described previously, the texel coordinates for rendering frame 1 are generated by the graphics processor 70, and are used by the address generator 100 to calculate memory addresses. The resulting memory addresses are checked against the entries in the tag cache 110. The blocks of texture data present in the data cache 112 are immediately provided the next processing stages of the pixel engine 78, while those that are not present are retrieved from the host memory 18 and written to the texture cache 104 prior to being provided to subsequent processing stages. Depending on the size of the texture cache 104, by the time frame 1 is rendered, the requested blocks of texture data from the textures A, B, C, and D have been written to the texture cache 104. The memory address and the ID number, ID=1, are written to the tag cache 110 and the corresponding blocks of texture data are written to data cache 112. FIG. 4A represents a memory map of the host memory 18 and the texture cache 104. The memory map illustrates the location and the ID number for the respective blocks of each texture, A, B, C, and D, stored in the host memory 18 and the texture cache 104. In the present example, it happens that textures A, B, C, and D are used for frames 2–6, and thus, no additional texture data may need to be written to the texture cache 104 for rendering these frames.

Figure 4B:
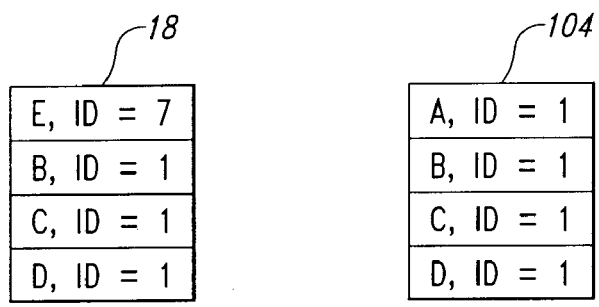

In preparation for rendering frame 7, textures B, C, D, and a new texture E will be referenced during rendering. The graphics processor 70 replaces texture A with texture E in the host memory 18 and assigns ID=7 to the blocks of texture data for texture E, that is, the ID number corresponds to frame 7. These four textures, B, C, D, and E, make up a second working set of texture data. The updated memory map is illustrated in FIG. 4B. When texture data from texture E is requested for application to the graphics primitive, the graphics processor 70 provides a texel coordinate for the texture E, as well the ID number, ID=7, to the address generator 100. A memory address is calculated, and is provided along with ID=7 to the cache controller 108 to check against the entries in the tag cache 110.

As a consequence of replacing texture A with texture E in the host memory 18, a block of texture data stored in the texture cache 104 may have the same address as the calculated memory address for a requested block of texture data from texture E. However, that block of texture data is from texture A from when frame 1 was rendered.

Figure 4C:
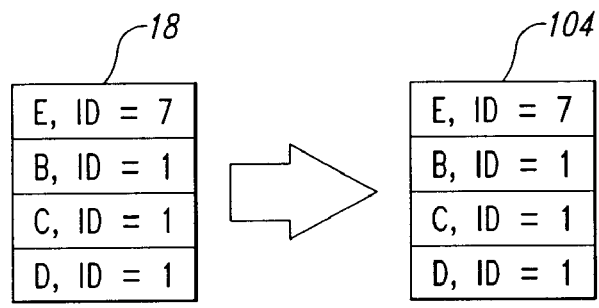

Although the calculated memory address may match an entry in the tag cache 110, the cache controller 108 will not respond with a cache hit because the ID number for the block of texture data presently stored in the data cache (i.e., ID=1 for texture A) does not match the ID number of the requested block of texture data (i.e., ID=7 for texture E). Consequently, there is a cache miss, and a memory request is made by the cache controller 108 to obtain the correct texture data from the host memory 18. As shown in FIG. 4C, the texture data retrieved from the host memory 18 is written to the data cache 112, and the corresponding address and ID number, ID=7, replace the former entries in the tag cache 110.

The remaining blocks of texture data stored in the host memory 18, which are from the textures B, C, and D, are unaffected by the replacement of the texture data from texture A with the texture data from texture E. Thus, when texture data from textures B, C, or D are requested, the graphics processor 70 will provide a texel coordinate and the appropriate ID number, that is, ID=1, to the address generator 100. ID numbers assigned to the blocks of data subsequently written to the host memory 18 will be assigned according to the method previously described.

In an alternative embodiment, a unique ID number may assigned to each different texture map. For example, texture A is assigned ID=1, texture B is assigned ID=2, texture C is assigned ID=3, and texture D is assigned ID=4. The ID number is provided to the cache controller 108 and checked against the entries in the tag cache 110 in the same manner as described previously.

Applying cache invalidation methods as described herein allows for a particular block of data in the texture cache 104 to be invalidated, and to be replaced with new texture data. It is no longer necessary to invalidate the entire texture cache 104 when new graphics data replaces older graphics data in the host memory 18. With such a cache management method, larger caches may be used efficiently. Furthermore, although individual blocks may be individually invalidated using this method, conventional circuitry (not shown) may also be included in the texture cache 104 to quickly reset the entire cache to a predetermined address, thus, effectively invalidating the entire cache when desired. Occasional invalidation of the entire cache may be facilitated by the cache management method described herein. For example, where the ID numbers are assigned to the blocks of data based on the frame number, the cache controller 108 may be programmed to invalidate the entire cache when the ID numbers reach a particular number. Thus, the particular number may be selected so that the entire cache is invalidated following the rendering of a specific sequence of frames, or after a specific time period has elapsed.

The cache invalidation method has been described herein with respect to large caches, however, it will appreciated that a similar technique may be used with virtually any size cache, and consequently, the scope of the present invention should not be limited by the size of the data cache in which the cache invalidation method is applied. Additionally, although the embodiments of the cache invalidation method have been described with specific application to caching texture data, some or all of the principles of the present invention may be used in other data caching applications as well.

From the foregoing it will be appreciated that, although specific embodiments of the invention have been described herein for purposes of illustration, various modifications may be made without deviating from the spirit and scope of the invention. For example, if texture data stored in the host memory 18 is replaced more than once a frame, the ID numbers assigned by the graphics processor 70 may be assigned based on the number of times texture data is changed rather than on the frame number being rendered. Accordingly, the invention is not limited except as by the appended claims.

What is claimed is:

1. A cache memory system for storing blocks of graphics data in a graphics processing system, the cache memory system comprising:
   a first memory to store an address and an associated ID number for each block of graphics data stored in the cache memory, the address corresponding to a storage location in the cache memory and the associated ID number assigned to distinguish between blocks of graphics data having the same address;
   a second memory to store blocks of graphics data corresponding to the addresses and associated ID numbers stored in the first memory; and
   a cache controller coupled to the first and second memories, in response to receiving a requested address and ID number for graphics data matching one of the addresses and associated ID numbers stored in the first memory, the cache controller controlling the second memory to output the block of graphics data corresponding to the matching address and associated ID number, in response to a stored entry having an address tag matching the requested address but an associated ID number not matching the requested ID number, the cache controller retrieving from a third memory graphics data corresponding to the requested address and ID number, replacing in the first memory the associated ID number for the stored entry and the corresponding graphics data in the second memory with the retrieved graphics data, and controlling the second memory to output the retrieved graphics data.

2. The cache memory of claim 1 wherein the first memory comprises a tag cache to store the address of each block of graphics data and an ID cache to store the associated ID number.

3. The cache memory of claim 1 wherein the second memory comprises a data cache.

4. The cache memory of claim 1 wherein the associated ID number is assigned to the blocks of graphics data when written to the memory and corresponds to a frame number of a graphics frame in which the blocks of graphics data is first used for rendering.

5. The cache memory of claim 1, further comprising an invalidation circuit coupled to the first memory to reset the addresses and associated ID numbers in the first memory to a predetermined value.

6. A cache memory for storing graphics data in a graphics processing system, the cache memory comprising:
   a first memory means for storing addresses corresponding to memory addresses at which the graphics data is stored;
   a second memory means for storing an ID number associated with the graphics data for each address stored in the first memory means;
   a data cache means for storing the graphics data corresponding to the addresses and ID numbers stored in the first and second memory means, respectively;
   a cache controller means coupled to the first and second memory means and the data cache means, in response to receiving an address and ID number for requested graphics data matching an entry stored in the first and second memory means, respectively, the cache controller means generating a hit signal causing the data cache means to provide the graphics data corresponding to the matching address and ID number, in response to a stored entry having an address tag matching the requested address but an associated ID number not matching the requested ID number, the cache controller means retrieving from a third memory graphics data corresponding to the requested address and ID number, replacing in the second memory means the associated ID number for the stored entry and the corresponding graphics data in the data cache means with the retrieved graphics data, and causing the data cache means to provide the retrieved graphics data.

7. The cache memory of claim 6, further comprising an invalidation circuit coupled to the first memory to reset the addresses and associated ID numbers in the first memory to a predetermined value.

8. A computer system, comprising:
   a central processing unit;
   a system memory coupled to the CPU;
   a bus coupled to the CPU; and
   a graphics processing system coupled to the bus having a graphics processor assigning ID numbers to blocks of graphics data stored in the system memory and a graphics processing stage receiving a requested address and ID number for graphics data from the graphics processor, the graphics processing stage including a cache memory for storing blocks of graphics data written to the system memory, the cache memory comprising:
      a first memory to store an address and an associated ID number for each block of graphics data stored in the cache memory, the address corresponding to a storage location in the system memory and the associated ID number assigned by the graphics processor to distinguish between blocks of graphics data having the same address;

a second memory to store blocks of graphics data corresponding to the addresses and associated ID numbers stored in the first memory; and a cache controller coupled to the first and second memories, in response to receiving a requested address and ID number for graphics data matching one of the addresses and associated ID numbers stored in the first memory, the cache controller controlling the second memory to output the block of graphics data corresponding to the matching address and associated ID number, in response to a stored entry having an address tag matching the requested address but an associated ID number not matching the requested ID number, the cache controller retrieving from a third memory graphics data corresponding to the requested address and ID number, replacing in the first memory the associated ID number for the stored entry and the corresponding graphics data in the second memory with the retrieved graphics data, and controlling the second memory to output the retrieved graphics data.

9. The computer system of claim 8 wherein the first memory comprises a tag cache to store the address of each block of graphics data and an ID cache to store the associated ID number.

10. The computer system of claim 9 wherein the second memory comprises a data cache.

11. The computer system of claim 9, further comprising an invalidation circuit coupled to the first memory to reset the addresses and associated ID numbers in the first memory to a predetermined value.

12. The computer system of claim 9 wherein the associated ID number is assigned to the blocks of graphics data when written to the memory and corresponds to a frame number of a graphics frame in which the blocks of graphics data is first used for rendering.

13. A computer system, comprising:

a central processing unit;

a system memory coupled to the CPU;

a bus coupled to the CPU; and a graphics processing system coupled to the bus having a graphics processor assigning ID numbers to blocks of graphics data stored in the system memory and a graphics processing stage receiving a requested address and ID number for graphics data from the graphics processor, the graphics processing stage including a cache memory for storing blocks of graphics data written to the system memory, the cache memory retrieving the cached graphics data by:

comparing the requested address and ID number to stored entries in a first memory having an address tag and associated ID number;

providing from a second memory graphics data corresponding to one of the stored entries having an address tag and an associated ID number matching the requested address and ID number;

retrieving from a third memory a retrieved graphics data corresponding to the requested address and ID number in response to a stored entry having an address tag matching the requested address but an associated ID number not matching the requested ID number;

replacing in the first memory the associated ID number for the stored entry and the corresponding graphics data in the second memory with the retrieved graphics data; and providing from the second memory the retrieved graphics data.

14. The computer system of claim 13 wherein the ID number assigned to blocks of graphics data stored in the system memory comprises a value corresponding to a frame number for a graphics frame being rendered when the blocks of graphics data are written to the system memory.

15. A method of caching blocks of graphics data stored in a memory, comprising:

assigning an ID number to blocks of graphics data stored in the memory, the ID number distinguishing between blocks of graphics data presently and formerly stored in the memory;

storing a tag and an ID number for each cached block of graphics data;

comparing a requested tag and ID number to the stored tags and ID numbers;

providing the cached block of graphics data corresponding to the tag and ID number matching the requested tag and ID number;

retrieving graphics data corresponding to the requested address and ID number in response to a stored tag matching the requested tag but the ID number associated with the stored tag not matching the requested ID number;

replacing the ID number associated with the stored tag and replacing the corresponding graphics data with the retrieved graphics data; and providing the retrieved graphics data.

16. The method of claim 15 wherein assigning the ID number to blocks of graphics data stored in the memory comprises assigning a value to the blocks of graphics data when written to the memory corresponding to a frame number for which the block of graphics data is first referenced.

17. The method of claim 15 wherein assigning the ID number to the blocks of graphics data stored in the memory comprises assigning a unique value to blocks of graphics data.

18. A method of retrieving graphics data from a cache, comprising:

comparing a requested address and ID number to stored entries in a first memory having an address tag and associated ID number;

providing from a second memory graphics data corresponding to one of the stored entries having an address tag and an associated ID number corresponding to the requested address and ID number;

retrieving from a third memory a retrieved graphics data corresponding to the requested address and ID number in response to a stored entry having an address tag matching the requested address but an associated ID number not matching the requested ID number;

replacing in the first memory the associated ID number for the stored entry and the corresponding graphics data in the second memory with the retrieved graphics data; and providing from the second memory the retrieved graphics data.

19. A graphics processing system for a computer system having a system memory, the graphics processing system, comprising:

a graphics processor assigning ID numbers to blocks of graphics data stored in the system memory;

a graphics processing stage receiving a requested address and ID number for graphics data from the graphics processor, the graphics processing stage including a cache memory for storing blocks of graphics data written to the system memory, the cache memory retrieving the cached graphics data by:

comparing the requested address and ID number to stored entries in a first memory having an address tag and associated ID number;

providing from a second memory graphics data corresponding to one of the stored entries having an address tag and an associated ID number matching the requested address and ID number;

retrieving from a third memory a retrieved graphics data corresponding to the requested address and ID number in response to a stored entry having an address tag matching the requested address but an associated ID number not matching the requested ID number;

replacing in the first memory the associated ID number for the stored entry and the corresponding graphics data in the second memory with the retrieved graphics data; and providing from the second memory the retrieved graphics data.

20. The graphics processing system of claim 19 wherein the ID number assigned to blocks of graphics data stored in the system memory comprises a value corresponding to a frame number for a graphics frame being rendered when the blocks of graphics data are written to the system memory.

21. The graphics processing system of claim 19 wherein the third memory comprises the system memory of the computer system.

* * * * *

UNITED STATES PATENT AND TRADEMARK OFFICE
CERTIFICATE OF CORRECTION

PATENT NO. : 6,734,867 B1
DATED : May 11, 2004
INVENTOR(S) : Munshi et al.

It is certified that error appears in the above-identified patent and that said Letters Patent is hereby corrected as shown below:

<u>Title page,</u>
Item [*] Notice, delete the phrase "by 899" and insert -- by 574 days --

Signed and Sealed this

Seventh Day of June, 2005

JON W. DUDAS
*Director of the United States Patent and Trademark Office*